United States Patent [19]

Perlegos

[11] Patent Number: 4,768,169
[45] Date of Patent: Aug. 30, 1988

[54] FAULT-TOLERANT MEMORY ARRAY

[75] Inventor: George Perlegos, Fremont, Calif.

[73] Assignee: SEEQ Technology, Inc., San Jose, Calif.

[21] Appl. No.: 546,593

[22] Filed: Oct. 28, 1983

[51] Int. Cl.[4] .................. G11C 11/40; G11C 8/00; G11C 29/00

[52] U.S. Cl. .................. 365/200; 365/230; 365/189; 365/184

[58] Field of Search ............... 365/200, 230, 184, 185; 371/8, 10; 307/219

[56] References Cited

U.S. PATENT DOCUMENTS

| | | | |
|---|---|---|---|
| 4,342,103 | 7/1982 | Higuchi et al. | 365/230 |
| 4,422,161 | 12/1983 | Kressel et al. | 365/200 |
| 4,471,482 | 9/1984 | Young | 365/200 |
| 4,481,609 | 11/1984 | Higuchi et al. | 365/230 |
| 4,485,459 | 11/1984 | Venkateswaran | 365/200 |

Primary Examiner—Stuart N. Hecker
Assistant Examiner—Glenn A. Goosage
Attorney, Agent, or Firm—Lyon & Lyon

[57] ABSTRACT

A memory array is organized into rows and columns of memory cells, each cell having a configuration which passes current or blocks current depending upon the state of that cell. The array includes sense circuits to sense cell state. In a preferred embodiment of the invention, an address signal sent to the memory array activates two sets of memory cells connected to the same sense lines, and the threshold level of the sense circuits is set above the level which would be sensed for a failed bit, so that a failed bit appears as if unprogrammed or erased. Because each bit is represented by a pair of memory cells, a failed cell in a pair will not affect operation of the functioning cell in the pair or result in error.

6 Claims, 2 Drawing Sheets

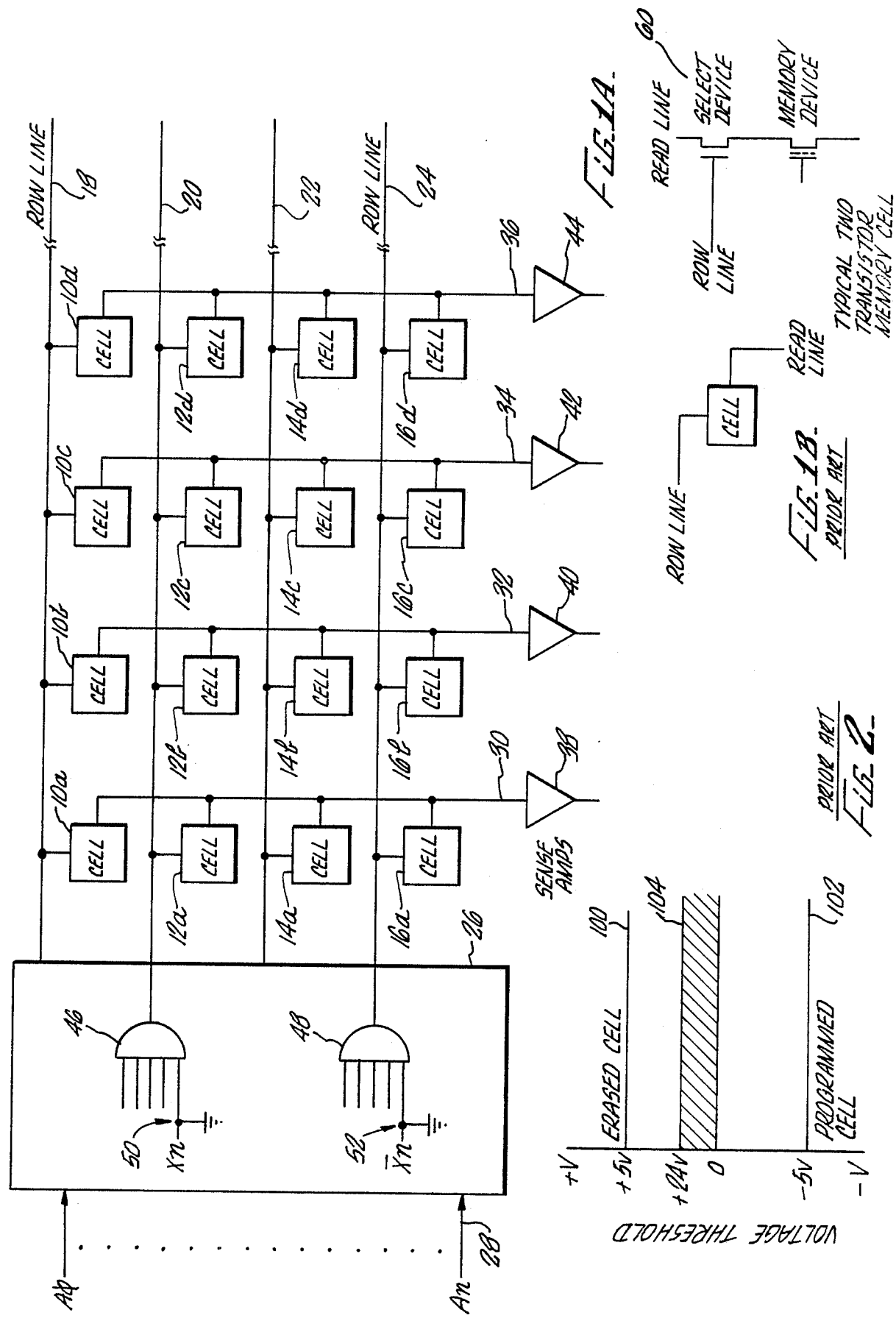

FAULT-TOLERANT MEMORY ARRAY

FIELD OF THE INVENTION

The present invention relates to semiconductor memory arrays, especially electrically programmable read only memories (EPROM's) and electrically eraseable read only memories (EEROM's). More particularly, the present invention relates to memory arrays which are fault-tolerant to single and most multiple bit failures which may occur during the lifetime of the device.

BACKGROUND OF THE INVENTION

EPROM and EEROM memory arrays are well known and are in wide use in virtually all facets of electronics technology. The most popular device structure for use in fabricating such arrays is the floating gate MOS transistor, wherein an electrically isolated or "floating" gate has charge carriers placed on it or removed from it to program and erase the device. The presence or absence of charge carriers on the floating gate alters the threshold of the memory device and is sensed when the device is read by sensing circuitry which reacts to the presence or absence of current flow in the memory device channel.

As fabrication technology has matured, array densities have increased while device geometries have shrunk to progressively smaller sizes. Manufacturers have been able to fabricate array sizes of 64K to 128K and even 256K arrays are planned.

The achievement of a process having a 100% yield of good parts has been an elusive goal because manufacturers have had to contend with a variety of circuit defects directly related to the manufacturing process itself. Such defects are discovered during testing after fabrication. Where these defects have occurred in memory devices themselves rather than in peripheral circuitry in the array, the industry has been able to respond by providing extra redundant rows or columns of memory devices which may be substituted for defective devices in an array. This technique has allowed manufacturers to achieve a higher yield of good array products.

Another category of defects is known to plague memory arrays of this type; however, these defects do not manifest themselves prior to shipment and customer use of the memory arrays and thus are not discoverable at test following fabrication. Such defects pose a dilemma for both the memory user and the memory manufacturer because they cannot be foreseen other than by statistical prediction.

This class of defects are memory device failures which may be caused by more than one mechanism but nevertheless manifest themselves similarly. Either the affected bit will not program, or it will program erase but will deteriorate due to charge leakage from the floating gate of the memory device. In both cases the ultimate effect is that the bit will be sensed as unprogrammed or erased and there is no known way to predict if and when such a failure will occur. In any given batch of memory array products, perhaps 3% will experience a single or multiple bit failure sometime after approximately 1000 program and erase cycles.

The effects of such bit failures may range from requiring a service call by maintenance personnel for the equipment containing the memory array device to consequences far more serious where the device is installed in military or other hardware in an application demanding high reliability.

In present military and other high-reliability applications utilizing these memory arrays, users have employed various techniques to guard against the possibility that a single or multiple bit failure will jeopardize system integrity. Such techniques include frequent testing and maintenance, replacement of aging devices; use of redundant arrays, and voting schemes or arbitration logic; use of error correcting codes, and use of extra bits at each memory address for parity bits.

Despite the use of these techniques by the prior art for minimizing the possibility of or correcting errors caused by memory device failures there exists a need for a memory array having increased reliability without the need to resort to external circuitry or utilization of extra parity bit space in each byte or extra peripheral circuitry on the memory chip itself. There further exists the need for an array which is immune to single bit failures and most multiple bit failures and which thus may be considered to be fault-tolerant.

Accordingly, it is an object of the present invention to provide a fault-tolerant memory array which is immune to single bit failures.

It is a further object of the present invention to provide a memory array which is immune to most multiple bit failures.

A further object of the present invention is to provide a memory array having 100% redundant memory locations without the need to employ additional on-chip selection circuitry.

Yet another object of the present invention is to provide a memory array which is immune to all single bit failures and most multiple bit failures without the need to employ external circuitry to correct errors caused by such failures.

An additional object of the present invention is to provide a memory array which is immune to all single bit and most multiple bit failures without resort to extra byte width for the purpose of error detection or correction codes.

Another object of the present invention is to provide a memory array which is immune to all single bit failures and most multiple bit failures which may be adapted from existing designs with a minimum of mask and processing changes.

These and other objects of the present invention will become apparent to those of ordinary skill in the art from the following description, drawings and appended claims.

BRIEF DESCRIPTION OF THE PRESENT INVENTION

A memory array is disclosed which is organized as rows and columns of memory cells as is known in the prior art. Such an array is composed of memory cells which are configured so as to pass current when in one state and inhibit the flow of current when in a second state and wherein sensing circuits on sense lines sense the state of the memory cell by sensing the current flow condition in the memory device.

The memory array of the present invention is addressed by a series of X and Y decoders as is known in the prior art wherein an X address decoder converts an incoming address line $AX_n$ to two signals, $X_n$ and $\overline{X_n}$. In designing a new array or in adopting an existing array design to conform to the present invention, one address line $AX_n$ has both of its outputs $X_n$ and $\overline{X_n}$ tied to a voltage level which enables both of them. Any address presented to the memory array will then activate two sets of memory cells connected to the same sense lines.

The sense amplifiers of the present invention may be designed or adapted from existing designs so that the threshold level of the sense amplifiers is set to be above the level which will be sensed by a failed bit, so that a failed bit will appear to the sense amplifier as an unprogrammed or erased bit. Alternatively, a threshold adjusting implant may be used to shift the threshold voltage of the memory devices in an array.

Since each bit is really comprised of two memory cells, a failed cell will not affect operation of the functioning cell or result in error. If the bit is one which should be programmed, the functioning cell will draw current and be sensed by the sense amplifier. If the failed cell is one which should be unprogrammed or erased, both the functioning and the failed cell will be unprogrammed and the sense amplifiers will sense correctly the condition of no current flow.

BRIEF DESCRIPTION OF THE DRAWINGS

FIG. 1a is a block diagram of a byte wide memory array and addressing circuitry using row redundancy according to the present invention.

FIG. 1b is a comparison of a single memory cell block and a typical schematic diagram of a two transistor memory cell which is suited for use in the present invention.

FIG. 2 is a graph showing the threshold voltages of a programmed cell, an erased cell and a failed cell.

DETAILED DESCRIPTION OF THE INVENTION

Figure 3:
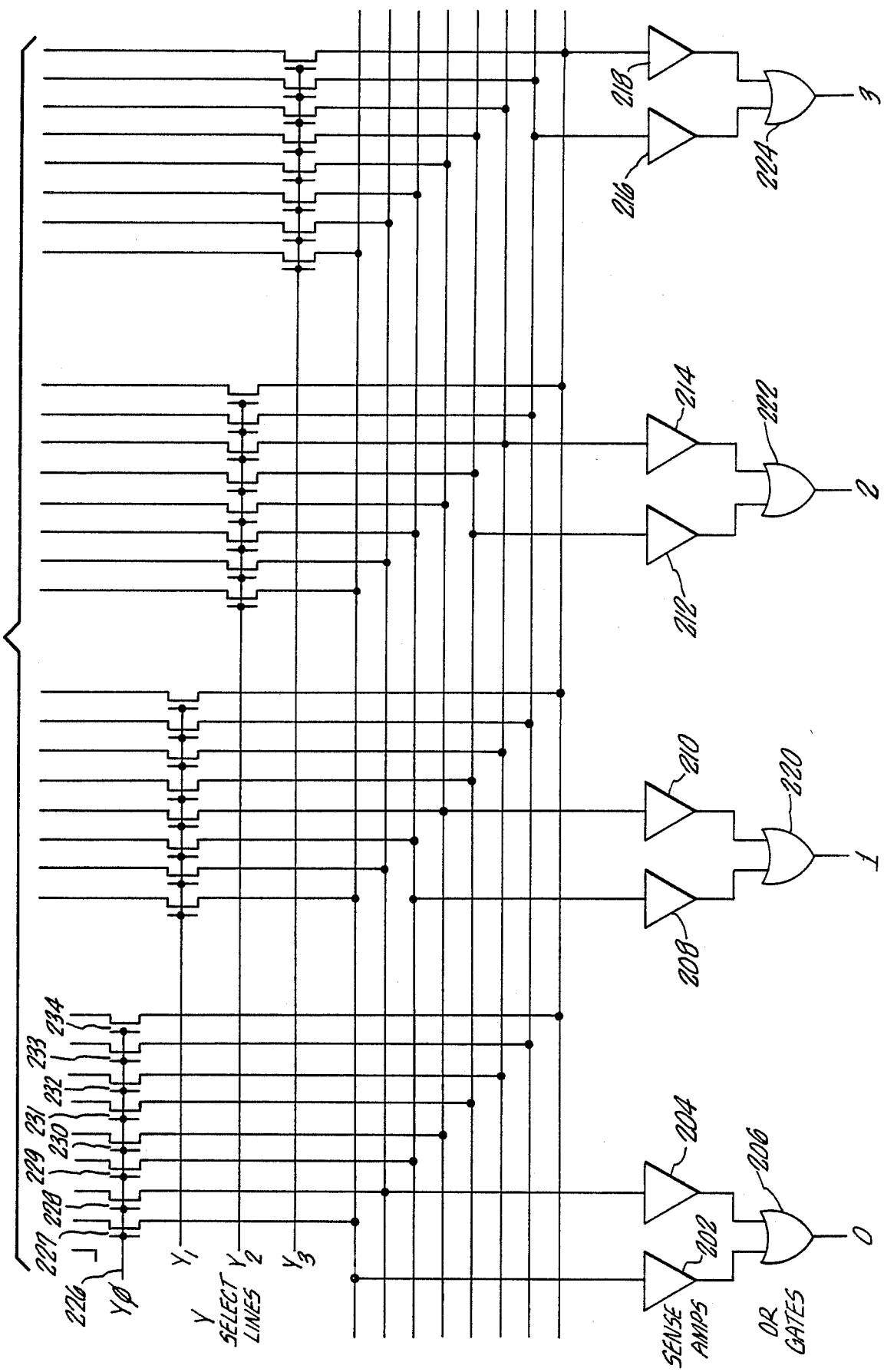
FIG. 3 is a block diagram of an alternate embodiment of a memory array using column redundancy according to the present invention.

Referring first to FIG. 1, a block diagram of a memory array configured according to the present invention, memory cells organized into bytes are shown at 10a–d, 12a–d, 14a–d and 16a–d. Cells 10a–d are shown connected to row line 18, cells 12a–d are shown connected to row line 20, cells 14a–d are shown connected to row line 22 and cells 16a–d are shown connected to row line 24. Row lines 18-24 are connected to address decoder 26 which, by decoding a set of address inputs 28, activates selected row lines by raising them to a pre-set voltage, such as 5 VDC, as is known in the art.

Corresponding bits, i.e., bits which occupy the same bit position in a byte, illustrated by cells 10a, 12a, 14a, and 16a for example, are connected to one another by read lines, read line 30 connecting memory cells 10a, 12a, 14a, and 16a; read line 32 connecting memory cells 10b, 12b, 14b and 16b; read line 34 connecting memory cells 10c, 12c, 14c, and 16c; read line 36 connecting memory cells 10d, 12d, 14d and 16d as is known in the art.

Memory cells 10-16, when selected, may have their states sensed, i.e., whether programmed or erased, by raising the appropriate row line 18-24 to its active state voltage and sensing the flow of current through the memory cells 10-16 by use of sense amplifiers 38-44 connected to read lines 30-36 respectively. For a cell to appear erased, the cell should not conduct current (an arbitrary choice of polarity).

The address decoder portions 26 of prior art memory arrays are arranged so that a combination of external inputs on input address lines 28 will result in only one row line (such as 18, 20, 22 or 24) becoming activated. A common way in which this is done is to divide the address inputs 28 into X and Y addresses, and to the extent relevant to this embodiment of the present invention, convert X address inputs so created into a pair of complimentary outputs illustrated in FIG. 1 as $X_n$ and $\overline{X_n}$. The addressing circuitry in address decoder 26 includes a plurality of gates, two of which are shown at 46 and 48. Gates 46 and 48 drive row lines 20 and 24 respectively. Gates 46 and 48 are driven by a sub-set of inputs chosen from all of the complimentary signals of which $X_n$ and $\overline{X_n}$ are representative. In this way, each row line may be conditioned to respond to a unique address combination on input address lines 28. A modification of this addressing scheme comprises a portion of the present invention.

A cell which has failed will appear to be unprogrammed. If such a cell is "wire-or'ed" to a good cell, the good cell maybe used to replace it without the need to physically disconnect the failed cell from the circuit. For example, referring again to FIG. 1, suppose that cell 12a has failed. If cell 16a was to be activated at the same time as cell 12a, i.e., row lines 20 and 24 both activated simultaneously, cell 16a will take over for cell 12a without being interfered with by the presence of defective cell 12a on commonly-shared read line 30.

This fact may be conceptually understood by considering both possible cases. Since cell 12a has failed it will draw no current to be sensed by sense amplifier 38 on read line 30. If cell 16a is programmed, it will draw current which will be sensed by sense amplifier 38. If cell 16a is erased it will draw no current. In neither case will the presence of failed cell 12a interfere with the reading of the state of cell 16a.

Thus, for a group of cells organized as a byte, i.e., 16a-d to replace a byte of similar cells 12a-d, all that is necessary is to provide for simultaneous activation of row lines 20 and 24, driven by gates 46 and 48. As illustrated in FIG. 1, one input to gate 46 is the signal $X_n$ and one input to gate 48 is its compliment signal $\overline{X_n}$. A relatively simple mask change is all that is required to enable, usually by grounding, the inputs of gates 46 and 48 sourced by those signals, $X_n$ and $\overline{X_n}$ as shown schematically at 50 and 52 in FIG. 1. If this procedure is performed on all addressing gates like 46 and 48 which use $X_n$ and $\overline{X_n}$ as inputs, or if the change is performed at the output of the X-decoder which generates complimentary signals $X_n$ and $\overline{X_n}$, the result will be that for any unique address supplied to input address lines 28, two row lines rather than one will be activated. In memory arrays having pre and post decoders, as is known in the art, $X_n$ and $\overline{X_n}$ signal lines driving predecoder stages are used, since they enable most efficient use of memory space versus redundancy.

In the case where no cell has failed, again using cells 12a and 16a as examples, both cells will merely work in tandem to drive sense amplifier 38. Where one has failed, however, the other will in effect take its place, and the memory array will continue to read out valid data.

It is readily apparent that most multiple cell failures are taken into account using the present scheme. For example, cells 12a-d could fail; cells 12a and 16b-d; 16a-d etc., could fail without effecting valid output, since each byte in the array is 100% redundant. Obviously, the only multiple bit cell failure which will effect output is failure of corresponding cells in redundant bytes, i.e., cells 12a and 16a, both fail. The odds against such an occurance are very high, but can be made even higher if another set of outputs of X decoders such as $X_{n+i}$ and $\overline{X_{n+i}}$ are grounded otherwise enabled. This would effectively create 3 bytes of redundancy per byte. In fact, the limitation on this provision of additional redundant bytes is reached only as the trade-off between reliability and chip real estate per effective byte becomes an undesirable burden.

In order to assure the functionality of the present inventions' solution to the reliability problem, the design of the sense amplifiers 38-44 must take into account the state of a failed cell. That is, the threshold at which the sense amplifier is set to change state must be adjusted to be beyond the level which would be sensed at the cell threshold voltage exhibited by a failed cell. While this point will be different for EPROM's and EEROM's, those skilled in the art will readily understand how to measure, calculate, or estimate this threshold and how to configure a sense amplifier to take this design consideration into account.

An alternative to changing the sensing threshold of sense amplifiers 38-44 or designing the shift point in new designs according to the present invention is to alter by implant the threshold voltage of memory cells 12-16. The target implant dose made to any memory device should be selected with the principles of FIG. 2 in mind; that is such dose should be selected to adjust the threshold of the memory device such that an adequate margin exists between the sense level set for the sense amplifiers to indicate a programmed cell and the level which an unprogrammed or failed cell will exhibit.

Referring now to FIG. 1b, a comparison is made between the block representing a memory cell used in FIG. 1a and a typical two transistor circuit which may comprise a memory cell, showing the row line and read line connections.

From FIG. 1b it can be seen that memory cell 10 may be comprised of two MOS transistors, select device 60 and memory device 62. In this illustrative two transistor cell it can be seen that read line 30 is connected to the drain of select device 60 and that row line 18 is connected to the gate of select device 30. The source of select device 60 is common to the drain of memory device 62. The source of memory device 62 is grounded and its programming gate is connected to circuitry (not shown) for programming.

It should be understood that FIG. 1b is merely illustrative of one type of memory cell which is adaptable for use in the present invention. Other configurations and numbers of devices, such as the four transistor cell disclosed in co-pending application Ser. No. 343,847, filed Jan. 29, 1982, issued as U.S. Pat. No. 4,558,344 on Dec. 1, 1985, assigned to the same assignee, will function equally well if used with the present invention, so long as the criteria set forth herein are followed.

Referring now to FIG. 2, a graph depicting cell threshold voltages, the voltage level for the threshold of an erased cell, typically +5VDC, is shown at line 100. The threshold voltage for a programmed cell, typically −5VDC, is shown at line 102. The threshold voltage for a "virgin cell", also the threshold voltage typically exhibited by a failed cell, typically from 0–2VDC, is shown by shaded area 104.

From FIG. 2 it can be seen that the sense amplifiers 38-44 of the present invention should be designed to respond to cells exhibiting a threshold voltage of less than about zero volts in order to recognize a programmed cell as such.

Referring now to FIG. 3, an alternative embodiment of the sensing portion of the present invention is depicted. While the embodiments of FIG. 1 is an implementation of the present invention using row redundancy, the embodiment of FIG. 3 uses column redundancy. An implementation equivalent to that shown in FIG. 1, i.e., a byte organization of four bits and an address slice of four words is used in FIG. 3, but those skilled in the art will readily recognize that address size and byte organization are ordinary design choices which are beyond the scope of this disclosure and within the ordinary level of skill in the art.

As illustrated in FIG. 3, numerous read lines 200 connect through select devices to sense amplifiers as is known in the art. Unlike the prior art, however, the outputs of sense amplifiers 202 and 204 are logic/ORed in OR GATE 206. The output of OR GATE 206 is used as one bit in the selected byte. Similarly sense amplifiers 208, 210, 212, 214, 216 and 218 and OR GATES 220, 222 and 224 are used to supply the other three bits of the exemplary four bit byte of FIG. 3.

It is apparent that a memory configured according to this embodiment of the present invention must have twice as many sense amplifiers as there are bits in the byte. Referring again to FIG. 3 it can be seen that twice as many columns of memory cells are needed in the embodiment of FIG. 1 are needed for the embodiment of FIG. 3.

Y select line 226 is connected to the gates of eight select devices 227-234. Select device 227 is connected to the input of sense amplifier 202 and select device 228 is connected to the input of sense amplifier 204. They are thus associated with redundant columns since bit 0 of the selected byte at the output of OR GATE 206 is the logic OR combination of a cell selected on each of two columns of cells rather than one as in the embodiment of FIG. 1.

The relationship of the cell thresholds for virgin, functioning and failed cells for the embodiment of FIG. 3 must be the same as that for the embodiment of FIG. 1a. Either the memory device thresholds of this embodiment must be adjusted by implant as is well known in the art, or the sense amplifier design must take into account the unadjusted threshold levels of the devices used in order for a memory array according to this embodiment to function properly.

While the present invention is, of course, suited for incorporation into new memory array designs, it is especially suited for incorporation into existing designs. The enabling of one or more sets of signals $X_n$ and $\overline{X_n}$ may be easily accomplished by minimal masking changes, usually in relatively few of the numerous masks needed to fabricate the memory array. The alteration, if necessary, of sense amplifier sensing thresholds is usually accomplished by sizing of the depletion device which forms a portion of the input of sense amplifiers commonly employed in memory arrays. Other ways of altering this threshold are within the skill of the circuit designer working in this art.

While the present invention has been disclosed utilizing an illustrative four bit byte, those skilled in the art will readily understand from the present disclosure how a memory array according to the invention may be configured having any byte size. Furthermore, while the invention has been disclosed as a preferred embodiment utilizing floating gate EPROM and EEROM cell arrays, those skilled in the art, from this disclosure, will readily be enabled to adopt it to other technologies so long as the memory cell failure mechanism is such as to exhibit behavior of an erased cell or virgin cell and so long as sensing thresholds may be shifted as disclosed herein. Accordingly, the scope of the present invention is intended to be limited only by the scope of the appended claims.

What is claimed is:

1. A fault-tolerant memory array including an array of memory cells organized into bytes of at least one bit in length and arranged in rows and columns according to byte location, each of said memory cells having a configuration which conducts current while in one of two states and does not conduct current while in the other of the two states depending upon the value of data stored in said bytes and wherein memory cells which fail when in operation do not conduct current beyond a predetermined level;

sensing means connected to corresponding memory cells in said bytes of memory cells for sensing the presence or absence of current flow beyond said predetermined level in said corresponding memory cells; and address means for receiving address signals indicative of byte location and for simultaneously selecting at least two of said bytes of memory cells for each address signal so received, said address means including row lines respectively connected to said rows of memory cells for simultaneously activating at least two of said rows of memory cells in response to each address signal received by said address means such that data stored in said simultaneously selected bytes of memory cells can be logically "OR-ed".

2. A fault-tolerant memory array as set forth in claim 1, wherein each of said address signals comprises a series of address inputs and said address means includes a decoder means which generates complimentary signals for each of said series of address inputs, said address means further including a plurality of gate means respectively connected to said row lines for receiving said complimentary signals generated by said decoder means and for activating selected ones of said row lines in response to predetermined combination of said complimentary signals, said decoder means having a means for forcing the complimentary signals associated with a unique one of said series of address inputs to the same voltage level in order to permit said address means to activate at least two of said rows of memory cells simultaneously.

3. A fault-tolerant memory array including an array of memory cells organized into bytes of at least one bit in length and arranged in rows and columns according to byte location, each of said memory cells having a configuration which conducts current while on one of two states and does not conduct current while in the other of the two states depending upon the value of data stored in said bytes and wherein memory cells which fail when in operation do not conduct current beyond a predetermined level;

address means for receiving address signals indicative of byte location and for simultaneously selecting at least two of said bytes of memory cells for each address signal so received, said address means including read lines respectively connected to said columns of memory cells such that at least two of said read lines are simultaneously activated for each bit location associated with the byte location indicated by each address signal, said read lines operating to carry current as a function of the data value of each bit in said bytes of memory cells; and sensing means connected to corresponding memory cells in said bytes of memory cells for sensing the presence or absence of current flow beyond said predetermined level in said corresponding memory cells, said sensing means including logic means connected to said read lines for logically "OR-ing" the data value corresponding to the current carried by each group of said read lines simultaneously activated for each bit location associated with the byte location indicated by each address signal.

4. A fault-tolerant memory as set forth in claim 3, wherein said sensing means also includes a plurality of amplifiers respectively interconnected between said read lines and said logic means.

5. A fault-tolerant memory array as set forth in claims 1 or 3, wherein said sensing means includes at least one amplifier means for changing state depending upon the presence or absence of current flow in said corresponding ones of said memory cells, said amplifier means having a threshold for changing state which is adjusted beyond said predetermined level of current flow.

6. A fault-tolerant memory array as set forth in claims 1 or 3, wherein said memory cells characteristically exhibit a threshold voltage which is adjusted such that a failed one of said memory cells will not conduct current beyond said predetermined level.

* * * * *